United States Patent [19]
Sirkis et al.

[11] Patent Number: 6,056,436
[45] Date of Patent: May 2, 2000

[54] SIMULTANEOUS MEASUREMENT OF TEMPERATURE AND STRAIN USING OPTICAL SENSORS

[75] Inventors: James S. Sirkis, Burtonsville, Md.; Harmeet Singh, Simsbury, Conn.

[73] Assignee: University of Maryland, College Park, Md.

[21] Appl. No.: 09/025,848

[22] Filed: Feb. 19, 1998

Related U.S. Application Data
[60] Provisional application No. 60/038,897, Feb. 20, 1996.

[51] Int. Cl.[7] .............................. G01K 9/00; G01K 11/00; G01B 9/02; G01B 11/00
[52] U.S. Cl. ........................... 374/161; 356/32; 356/345; 374/142
[58] Field of Search .................................... 374/161, 142, 374/143; 250/227; 350/12; 356/32, 352, 345

[56] References Cited
U.S. PATENT DOCUMENTS

| | | | |
|---|---|---|---|
| 4,151,747 | 5/1979 | Gottlieb et al. ........................ | 374/161 |
| 4,295,739 | 10/1981 | Meltz et al. ............................ | 374/161 |
| 4,761,073 | 8/1988 | Meltz et al. ............................ | 356/32 |
| 4,773,753 | 9/1988 | Hirose et al. ......................... | 356/35.5 |
| 4,775,668 | 10/1988 | Davis ..................................... | 374/161 |
| 4,806,012 | 2/1989 | Meltz et al. ............................ | 356/32 |
| 4,842,403 | 6/1989 | Tarbox et al. .......................... | 374/161 |
| 4,928,004 | 5/1990 | Zimmermann et al. ............ | 250/227.14 |
| 4,950,883 | 8/1990 | Glenn ................................. | 250/227.14 |
| 4,950,886 | 8/1990 | Claus et al. ......................... | 250/227.14 |
| 4,996,419 | 2/1991 | Morey ................................... | 250/227.18 |
| 5,009,505 | 4/1991 | Malvern ................................. | 356/352 |
| 5,301,001 | 4/1994 | Murphy et al. ........................ | 374/130 |
| 5,359,405 | 10/1994 | Andrews ............................... | 356/35.5 |
| 5,397,891 | 3/1995 | Udd et al. ........................... | 250/227.18 |
| 5,399,854 | 3/1995 | Dunphy et al. ..................... | 250/227.17 |
| 5,451,772 | 9/1995 | Narendran .......................... | 250/227.19 |
| 5,493,113 | 2/1996 | Dunphy et al. ..................... | 250/227.19 |
| 5,513,913 | 5/1996 | Ball et al. .............................. | 374/120 |
| 5,528,367 | 6/1996 | Putnam et al. ........................ | 356/345 |
| 5,666,195 | 9/1997 | Shultz et al. .......................... | 356/352 |

FOREIGN PATENT DOCUMENTS
2102569  2/1983  United Kingdom .................. 374/161

*Primary Examiner*—G. Bradley Bennett
*Assistant Examiner*—Gail Verbitsky
*Attorney, Agent, or Firm*—Watson Cole Grindle Watson, P.L.L.C.

[57] ABSTRACT

Cascaded waveguide sensors with different sensitivities to temperature and strain produce independent temperature and strain measurements. In one embodiment a first sensor is formed of a first optical material having a corresponding first sensible thermomechanical response and a second sensor is formed of a second optical material having a corresponding second sensible thermomechanical response. The first and second thermomechanical responses are sufficiently different so as to produce independent temperature and strain measurements. Particular embodiments employ intrinsic or extrinsic Fabry-Perot interferometers (IFP, EFP),sensors, in-line fiber etalon (ILFE) sensor and a fiber-optic Bragg grating.

24 Claims, 6 Drawing Sheets

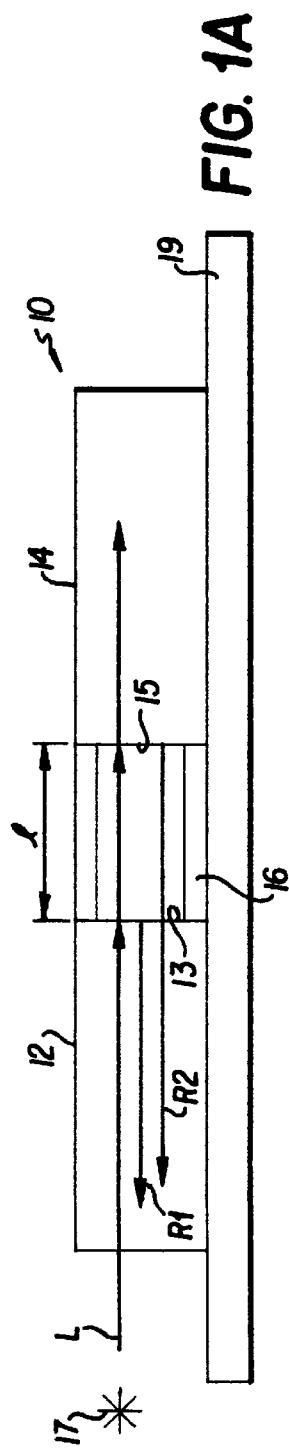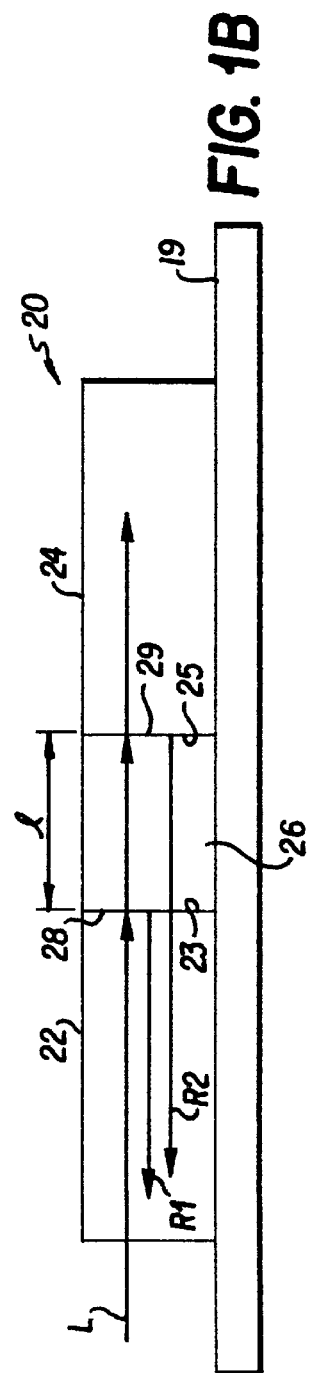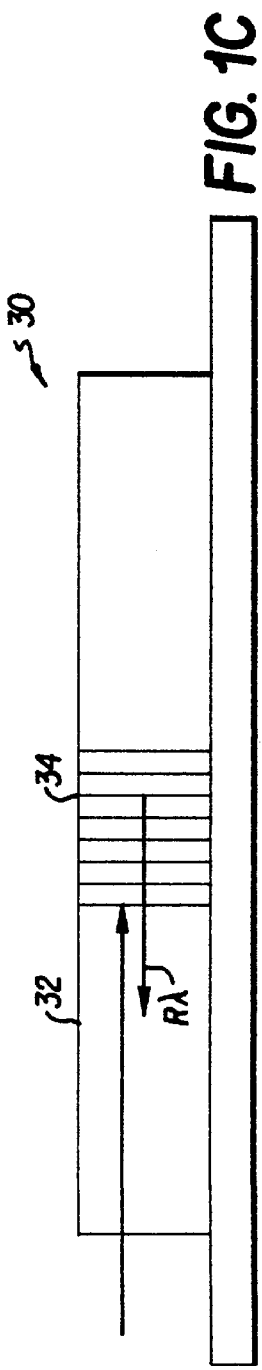

CASCADED OPTICAL SENSORS WITH DIFFERENTIAL THERMO-MECHANICAL RESPONSES PRODUCING INDEPENDENTLY SENSIBLE INDICATIONS OF TEMPERATURE AND STRAIN

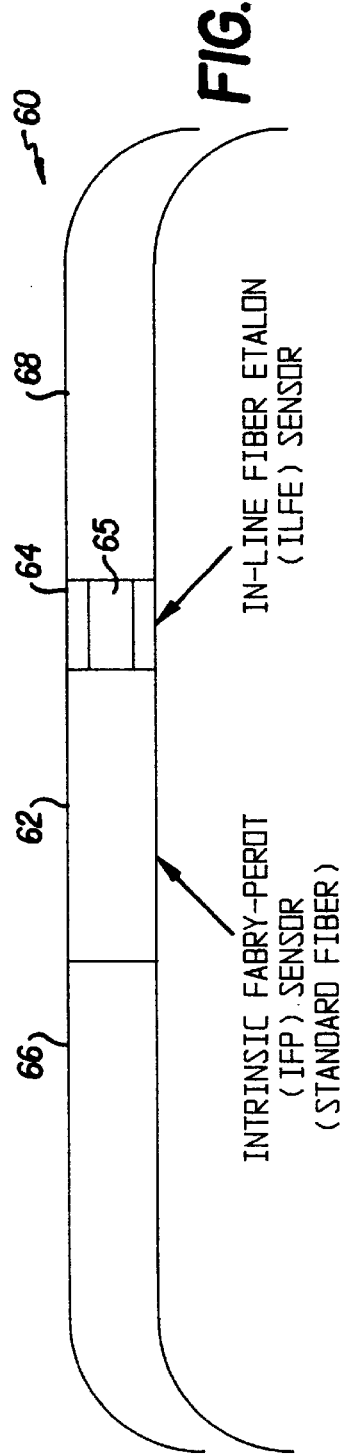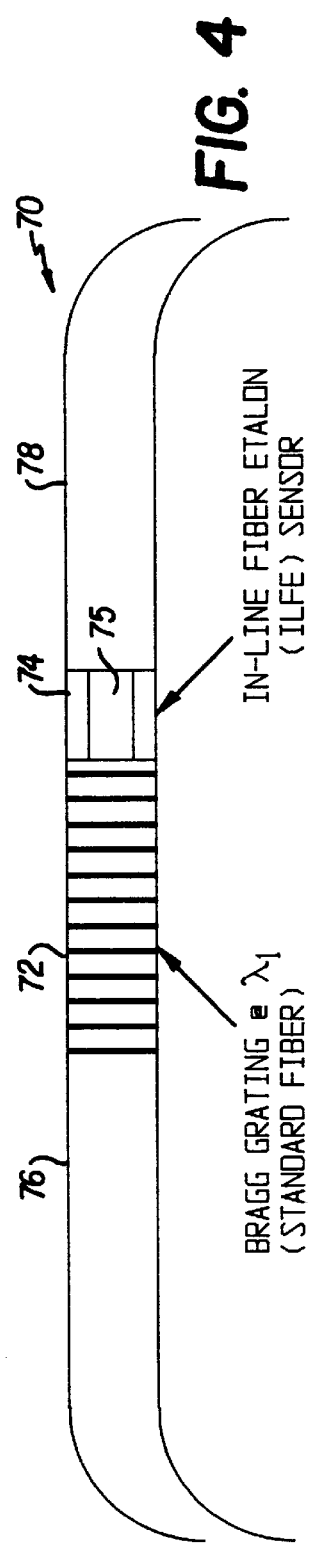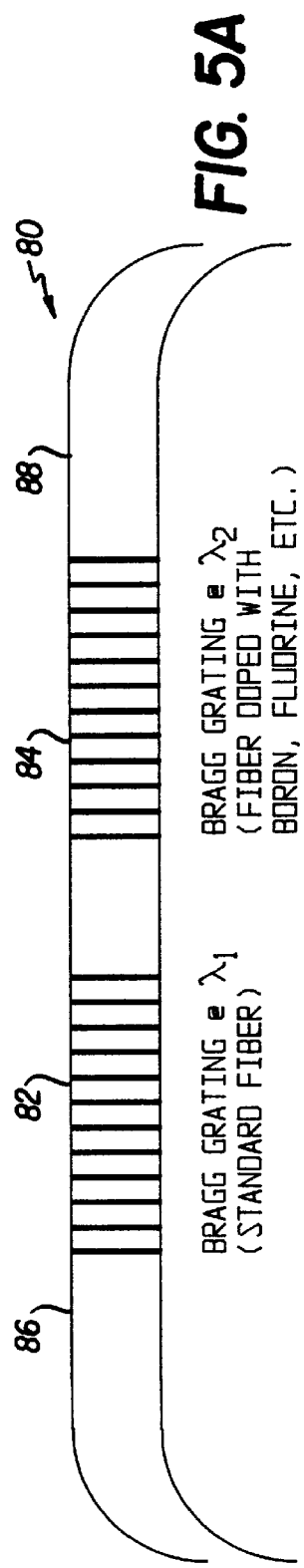

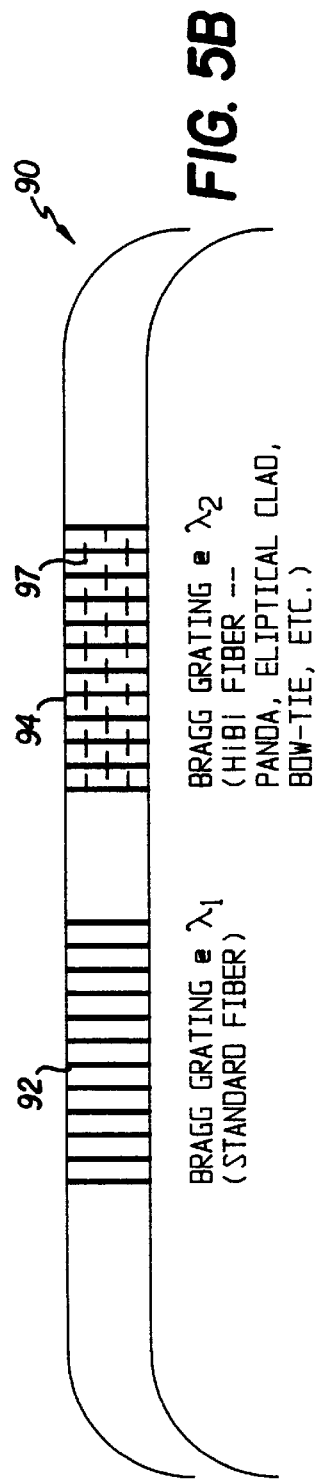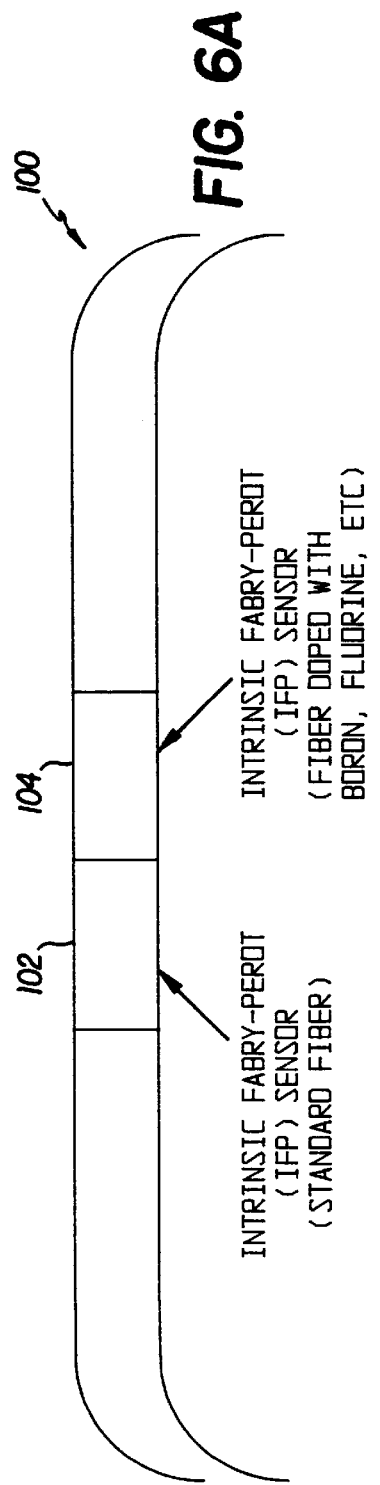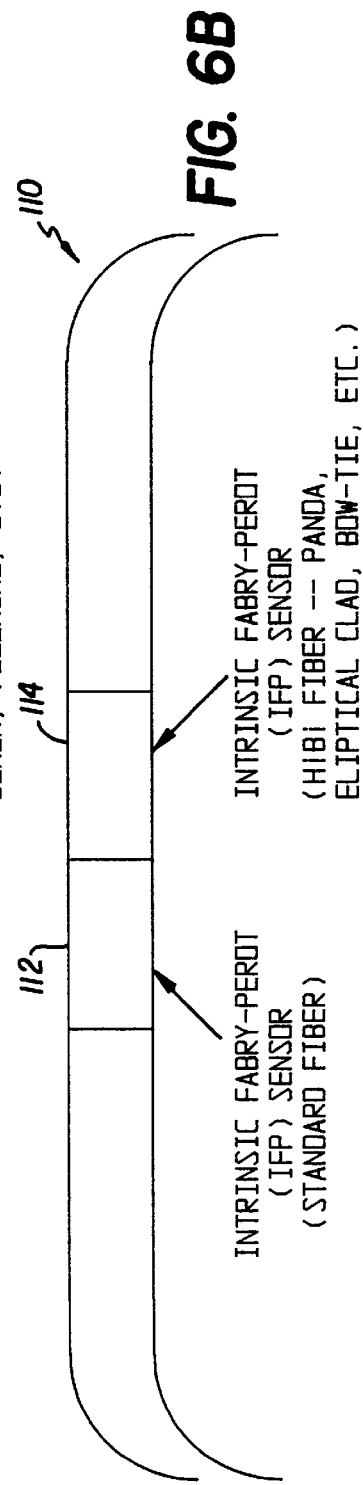

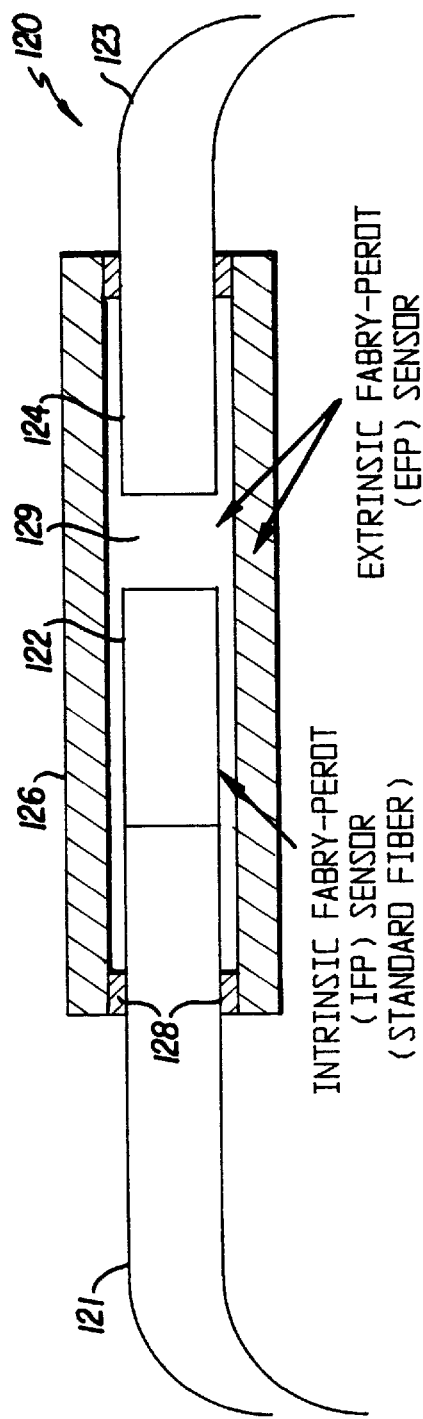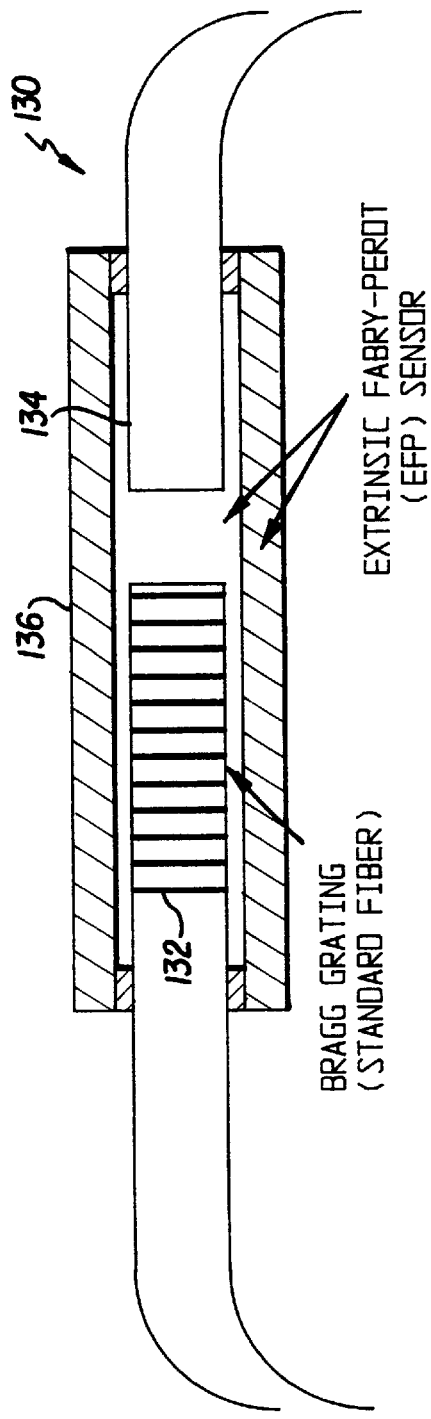

SIMULTANEOUS MEASUREMENT OF TEMPERATURE AND STRAIN USING OPTICAL SENSORS

CROSS-REFERENCE TO RELATED APPLICATION

This application is related to a provisional application Ser. No. 60/038,897 filed in the U.S. Patent and Trademark Office on Feb. 20, 1996, the teachings of which are incorporated herein by reference.

BACKGROUND OF THE INVENTION

The invention pertains to thermomechanical optical sensors and in particular to optical sensors adapted to independently sense temperature and strain.

General State of the Art

Various optical sensors for measuring temperature and strain are known in the art. One such sensor, known as the in-line fiber etalon (ILFE) sensor, is sensitive to strain in the fiber axis direction but is insensitive to temperature and strain components that are not in the fiber axis direction. The ILFE sensor is made by fusing two cleaved single mode fibers to a same diameter capillary tube forming an air filled cavity of a given length. When the sensor is illuminated from one end, two Fresnel reflections are created at the glass/air interfaces at the cleaved fiber ends. These reflections propagate back toward the light source, where they are directed by an optical phase detection system. Because the second reflection travels an extra difference equal to the round trip distance through the air cavity, it is out of phase with respect to the first reflection. This phase difference can be measured to determine the length of the air cavity. When such a device is bonded or imbedded into a structure, any elongation of the structure results in an elongation of the sensor cavity. Thus such a device may be used to monitor the strain by measuring the length of the sensor air cavity. However, the device is temperature sensitive, and temperature compensation is required to obtain accurate results.

One known optical phase detection system for ILFE sensors is to use path match differential interferometry (PMDI). Such systems use a low coherence light source such as a light-emitting diode to illuminate the sensor. Light returned from the sensor is directed to an unbalanced reference interferometer which is located in a readout system. In such a configuration if a difference in length between two legs of the reference interferometer is substantially equal to the round trip distance for the sensor cavity, then the signal is reconstructed at the output for the reference interferometer. As the offset of the reference interferometer is adjusted over a large range, the sensor signal will vary in strength from zero to a maximum and then back to zero. The sensor signal is maximum when the offset of the reference interferometer is equal to the round trip distance through the sensor cavity. By measuring the sensor signal level as a reference interferometer is tuned, an absolute measurement of the sensor gap length can be made. As a result, the strain is also known because the air gap length is uniquely related to the sensor strain level.

It would be useful to employ a sensor which can measure temperature in addition to strain. However, it is of little use to have a device that is sensitive to both strain and temperature if only the combination of the two effects is known. Past attempts to provide sensors for measuring both temperature and strain have used either a combination of interferometric and polarimetric sensors, two interferometers along independent Eigen axes or two Bragg gratings in a high birefringent optical fiber. These approaches are generally prone to high errors and instabilities because the equations that must be solved are not sufficiently independent. Such equations are known, and examples of the equations are disclosed in the provisional application noted above.

It is therefore desirable to develop a sensor capable of measuring axial strain and temperature on the surface or inside of a structural member.

SUMMARY OF THE INVENTION

The present invention is based upon the discovery that cascaded sensors with different sensitivities to temperature and strain produce independent temperature and strain measurements.

In one embodiment the invention is an optical sensor comprising first and second sensors, each sensor for measuring at least one of temperature and strain, the first sensor is formed of a first optical material having a corresponding first sensible thermomechanical response and the second sensor being formed of the second optical material having a corresponding second sensible thermomechanical response. The first and second thermomechanical responses are sufficiently different so as to produce independent temperature and strain measurements. In a particular embodiment the sensors may comprise an intrinsic or extrinsic Fabry-Perot interferometer (IFP, EFP), an in-line fiber etalon (ILFE) sensor and a fiber-optic Bragg grating, and wherein the sensors employ optical materials having different temperature dependent refractive indices so that signals from each of the sensors may be separated for independent resolution of temperature and strain.

Particular embodiments include cascaded IFP in standard fiber and ILFE sensors; cascaded Bragg in standard (e.g., undoped) fiber and ILFE sensors; cascaded Bragg sensors, one in standard fiber and one in doped fiber; cascaded Bragg sensors, one in standard fiber and one in high birefringence, e.g., PANDA, elliptical clad and bow-tie fibers; cascaded IFP in standard fiber and IFP in doped fiber; cascaded IFP in standard fiber and IFP in high birefringent, e.g., PANDA, elliptical clad and bow-tie fiber; EFP and IFP in standard fiber inside the alignment tube; and EFP with Bragg grating in standard fiber inside the alignment tube.

BRIEF DESCRIPTION OF THE DRAWINGS

FIG. 1A–D schematically illustrate various types of sensors which may be employed in various embodiments of the invention;

FIG. 3 is a schematic illustration of an embodiment of the invention employing cascaded IFP and ILFE sensors;

FIG. 4 is a schematic illustration of an embodiment of the invention employing cascaded Bragg grating and ILFE sensors;

FIGS. 5A and 5B are schematic illustrations of alternative embodiments of the invention employing cascaded Bragg gratings at different wavelengths;

FIGS. 6A and 6B are schematic illustrations of alternative embodiments of the invention employing cascaded IFP sensors;

FIGS. 7A and 7B are schematic illustrations of alternative embodiments of the invention employing an extrinsic EFP sensor.

DESCRIPTION OF THE INVENTION

Figure 1D:
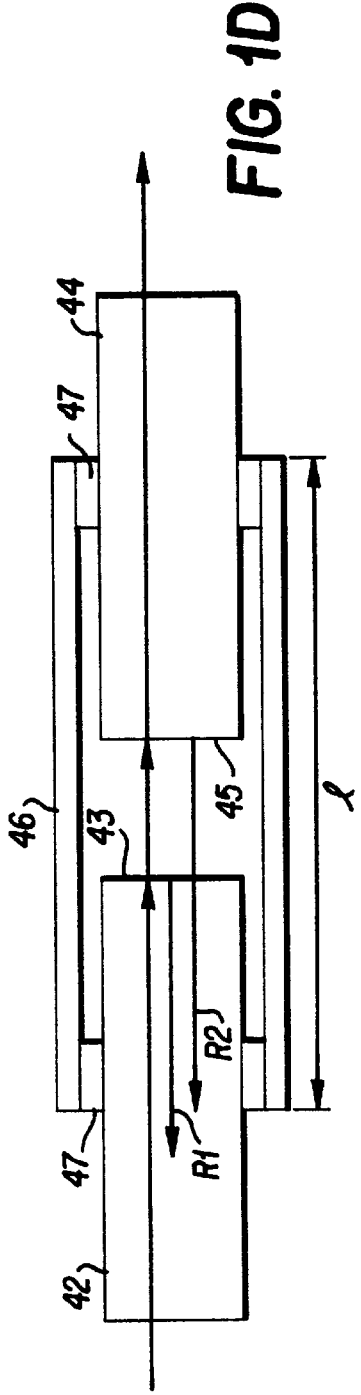

Before discussing the invention in detail, a brief description of the different types of known sensors employed in the present invention is presented hereinafter with respect to FIGS. 1A–1D. FIG. 1A represents an in-line fiber etalon (ILFE) sensor 10 in which two single mode fibers 12 and 14 having respective cleaved end faces 13 and 15 are fused to a small diameter hollow tube 16. A cavity 18 of length l is defined by the space between the endfaces 13 and 15 of the respective fibers 12 and 14 as shown. A portion of the input light L from a source 17 is reflected from the first endface 13 of the fiber 12 as R1. A portion of the light L passes through the cavity 18, and a portion of the transmitted light is reflected as R2 from the face 15 of the second fiber 14. The phase difference between the R1 and R2 is a measurement of the length l of the cavity 18. If the sensor 10 is attached to the surface of a beam 19, force exerted on the beam lengthens or shortens the cavity which in turn affects the phase difference between the reflected signals R1 and R2. Thus a measure of the strain on the beam 19 may be made.

FIG. 1B illustrates an intrinsic Fabry-Perot (IFP) sensor 20 in which single mode fibers 22 and 24 having respective cleaved ends 23 and 25 are fused to a length l of single mode sensor fiber 26 in which the endfaces 28 and 29 have been partially mirrored. The length l of sensor fiber 26 defines the cavity length. The source light L is first reflected as R1 from the partial mirrored surface 28, as shown, and a portion of the transmitted light is reflected as R2 from the partial mirrored surface 29. The length l of the cavity is a function of the stress on the fiber or sensor 20.

FIG. 1C illustrates a Bragg fiber sensor 30 formed of a single mode fiber 32 having one or more Bragg gratings 32 formed therein in a known manner. Broadband source light L enters the fiber and the grating 32 reflects a narrow wavelength of band of light R$\lambda$. The wavelength of the reflected light is a measure of the applied strain.

Other arrangements are also possible, including the extrinsic sensor 40 shown in FIG. 1D in which cleaved fibers 42 and 44 having respective reflective endfaces 43 and 45 are aligned in a tube 46 or sleeve for support and are secured by a suitable adhesive 47 such as epoxy. The reflected light R1 and R2 provide an indicator of stress. The long outer tube 46 allows the sensor to be more sensitive to stress.

Figure 2:
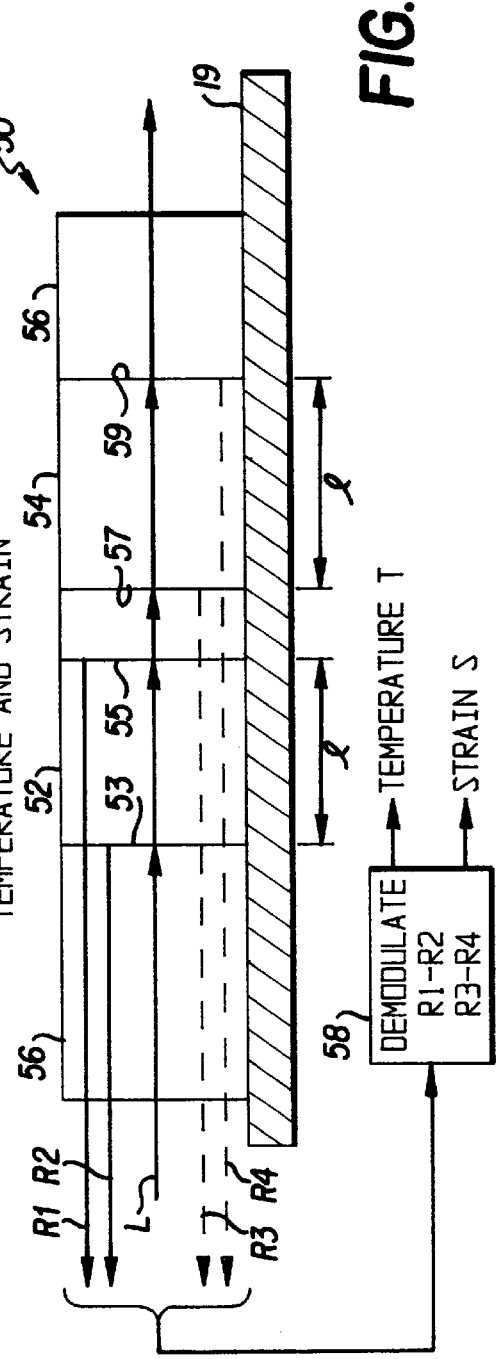
FIG. 2 is a generalized schematic illustration of cascaded sensors according to the invention.

FIG. 2 illustrates in a generalized form an embodiment of a sensor 50 according to the invention comprising cascaded optical sensors 52 and 54 with differential thermomechanical responses producing independently sensible indications of temperature and strain. In the arrangement of FIG. 2 first sensor 52 and second sensor 54 are coupled in series to a single mode I/O waveguide 56. A broad band coherent light source provides input light L to the sensor 50. The light L is carried by the I/O waveguide 56 into the first sensor 52, which produces first reflections R1 and R2 from the respective ends 53 and 55 of the first sensor 52. The light continues to the second sensor 54 and is reflected as R3 and R4 from the respective ends of the second sensor 54. The reflections R1 and R2 have a phase difference in accordance with the distance or length l1 between the endfaces 53 and 55 of the first sensor 52. Likewise, the reflected light R3 and R4 have a phase difference corresponding to the length l2 between endfaces 57 and 58 of the second sensor 54. It should be understood that when Bragg gratings are used, as hereinafter described, the wavelength of the reflections is a function strain in the sensors. The reflections R1–R4 are coupled to an optical demodulator 58, whereupon independent temperature T and strain S measurements are produced as shown.

As illustrated in the drawing, reflections R1 and R2 have a unique characteristic, determined by characteristic of the material M1 from which it is formed. Whereas reflections R3 and R4 have a different unique characteristic, likewise determined by material M2. For example, the first sensor 52 has a thermomechanical response which affects the index or refraction of the light in a unique way. Likewise, the sensor 56 has a thermomechanical response which affects the index of refraction in a unique way. These differences thereby allow sensors to produce independently sensible indications of temperature and strain because the reflections R1 and R2 may be easily demodulated or separated from reflections R3 and R4. It should be understood that both sensors 52 and 54 are responsive to temperature and strain. However, in accordance with the invention, the sensors are not responsive to strain and temperature in the same way. Accordingly, temperature and strain may be independently determined.

The sensors 52 and 54 and waveguides 56 may be of the various types of fiberoptic devices described in FIGS. 1A–1D. Alternatively, the sensors 52 and 54 and waveguides 56 may be planar or channel type optical waveguides. Also, the sensors may be made of glass or plastic as desired. However, plastic, single-mode optical waveguides are at present mostly experimental.

FIG. 3 illustrates an exemplary embodiment of a sensor 60 in accordance with the invention. The sensor 60 includes an IFP sensor 62 cascaded with an ILFE sensor 64. The cascaded sensors are fused between lengths of single mode fiber 66 and 68. In the arrangement illustrated the IFP sensor 62 is formed of a length of single mode glass fiber such as illustrated in FIG. 1B. The glass fiber has a selected index of refraction. Typically the index of refraction may be about 1.5 although this is exemplary only.

The ILFE sensor 64 is formed in the manner as illustrated in FIG. 1A with an air-filled cavity 65. Air has an index of refraction of about 1. Simultaneous temperature and strain measurements are possible because the phase response of the ILFE sensor 64 is strongly sensitive to strain but weakly sensitive to temperature, whereas the IFP sensor 62 is strongly sensitive to both temperature and strain. This is because the index of refraction of the glass in the IFP sensor 62 is more sensitive to temperature and strain than the air in cavity 65 of sensor 62. In the particular embodiment illustrated, the IFP may have a temperature sensitivity more than 100 times greater than the temperature sensitivity of the ILFE sensor 64. The disparity in the strain and temperature sensitivities enables a direct solution to well-defined equations (described in the provisional application) for strain and temperature for each sensor. It is important also to point out that calibration is not required because all of the optical parameters are independent and measurable.

As used herein, the term "standard" means that the fiber optic or waveguide material is known type of fiber. A standard fiber typically has sufficient doping in the core or cladding to establish the required difference in reflective index therebetween which allows the optical fiber to act as a waveguide. A doped fiber is one in which additional dopants are added, e.g., boron, fluorene etc. to modify the wavelength characteristics, more typically the index of refraction. In particular dopants not only raise or lower the index of reflection of the glass fiber, they also affect the sensitivity of the fiber to changes in temperature and strain. Thus, a standard fiber responds differently to temperature and strain than a doped fiber or an air filled cavity. It should be understood that whichever type of fiber or cavity is used, the sensitivity of one sensor should be different than the other.

FIG. 4 illustrates a sensor 70 in accordance with another embodiment of the invention in which a standard fiber Bragg grating sensor 72 is cascaded with an ILFE sensor 74 having an air filled cavity 75. The cascaded sensors are fused together between single mode fibers 76 and 78. In the arrangement illustrated the Bragg grating 72 operates at a first wavelength which is sensible by an appropriate detector. The ILFE sensor 74 operates by producing a phase change in the reflected light which is sensibly distinct from the reflected light from the Bragg grating. In the arrangement shown, the temperature response of the Bragg grating sensor 72 is significantly higher than that of the ILFE sensor 74, thereby providing a sensible distinction between the two signals.

FIG. 5A illustrates an embodiment of a sensor 80 employing cascaded first and second Bragg grating sensors 82 and 84 fused between lengths of single mode fiber 86 and 88. Bragg grating 82 operates at a first wavelength $\lambda 1$ and may be in a standard or generally undoped fiber, whereas sensor 84 operates at a second wavelength $\lambda 2$ and may be doped with boron, fluorine or other appropriate material. The index of refraction of the standard fiber is different from the index for refraction of the doped fiber. More importantly, however, as noted above, the sensitivity of the index of refraction of the standard fiber is significantly different than the temperature sensitivity of the index of refraction of the doped fiber. This disparity in temperature sensitivity of the indices of refraction provides a sensible difference in the reflected signals.

FIG. 5B is an alternative arrangement of a sensor 90 employing cascaded Bragg sensors 92 and 94 similar to the arrangement of FIG. 5A. The first sensor 92 is operative at a first wavelength $\lambda 1$ and the second Bragg grating 94 is operative at a second wavelength $\lambda 2$. The difference in the arrangement of FIG. 5A is that the second Bragg grating 94 has a temperature sensitivity which is produced by a high birefringent type fiber (illustrated schematically by the dotted lines 97) employing for example a PANDA, an elliptical clad fiber or a bow-tie fiber. Such arrangements are known in the art. Generally speaking, however, such arrangements introduce points or regions of stress concentration in the fiber such that as the temperature changes the stress concentrations are more pronounced and thus the index of refraction of the fiber is rendered more temperature and stress sensitive. It should be understood that in the arrangement of FIG. 5A, the first Bragg grating 92 may be in a standard fiber.

FIG. 6A illustrates yet another embodiment of a sensor 110 of the invention employing an IFP sensor 102 formed in a standard fiber cascaded with an IFP sensor 104 formed in a doped fiber. Here, as in the arrangement noted above, the temperature sensitivity of the index of refraction of the undoped fiber is different than the temperature sensitivity of the index of refraction of the doped fiber. The result is that there is a sensible difference between the reflected signals and temperature and strain may be independently measured.

FIG. 6B illustrates an alternative embodiment of a sensor 110 employing an IFP sensor 112 in standard fiber cascaded with an IFP sensor 114 in a high birefringent fiber such as a PANDA, elliptical clad or bow-tie fiber. Here, as described above, the high birefringent fiber has regions of stress concentration which cause the index of refraction to be more sensitive to temperature and strain than in the undoped fiber. The result, as noted, is a sensible difference in the response of each sensor whereby temperature and strain measurements may be made independently.

FIG. 7A is an illustration of yet another embodiment of a sensor 120 according to the invention employing an IFP sensor 122 cascaded with an extrinsic Fabry-Perot EFP sensor 124. The sensors 122 and 124 are secured in an alignment tube 126 between fibers 121 and 123 by means of adhesive 128. In this arrangement the intrinsic IFP sensor 122 is formed of glass having a high refractive index and the EFP sensor 104 has an air gap or cavity 129 formed between the endfaces of the IFP sensors. In the arrangement illustrated the IFP sensor 122 has an index refraction which has a higher temperature sensitivity than the extrinsic or EFP sensor 124.

FIG. 7B illustrates an alternative arrangement of a sensor 130 similar to that of FIG. 7A employing a Bragg grating detector 132 (substituted for the IFP sensor) and an EFP sensor 134 supported in tube 136. The combination then of Bragg grating sensor 132 and the EFP sensor 134 provides a cascaded sensor 130 in accordance with the invention having the ability to produce independent temperature and strain measurements.

The arrangements illustrated in FIGS. 5A and 5B employing two cascaded Bragg gratings have greater multiplexing potential because the multiplexing is accomplished using purely wavelength division multiplexing techniques. This enables commercial readout multiplexing systems to be used, which is an advantage. The minimum length of the sensors is about 4 mm, and is dictated by the reflectivity of the grating. The smaller the length the smaller the reflectivity.

The arrangements involving cascaded IFPs as illustrated in FIGS. 6A and 6B have the advantage of smallness. Such sensors may be, for example, less than about 100 microns in total length.

The arrangements employing ILFEs may be more accurate than cascaded gratings or cascaded IFPs. However, the multiplexing potential of these sensors is limited to about 5 sensors as opposed to hundreds possible with Bragg gratings. The intrinsic components of the Bragg and IFP arrangements are about 1 mm long in order to minimize the effect of the stress concentration at the air/glass interface. Otherwise, the stress state will be fully three-dimensional along the optical fiber, which would prevent the use of all the standard calibration equations known as the phase-strain-temperature equations for IFPs, or wavelength-strain-temperature equations for Bragg wavelengths. The length limitation has been determined through finite element stress techniques.

The extrinsic arrangements involving the alignment tube, that is, have accuracy characteristics similar to those employing the ILFE sensors because both concepts use Fabry-Perot cavities formed in air. The multiplexing is also limited like the ILFE options. The EFP options are easy to manufacture, but the sensor gauge length will always be larger than the options, i.e., on the order of about 6 to 10 times larger. The sensor wavelength is dictated by the length of the alignment tube. However, it should be understood that the long alignment tube provides good sensitivity to stress, whereas in the ILFE option the air gap is governed by the length of the connecting tube, which is much smaller than the EFP arrangement.

Figure 8A:
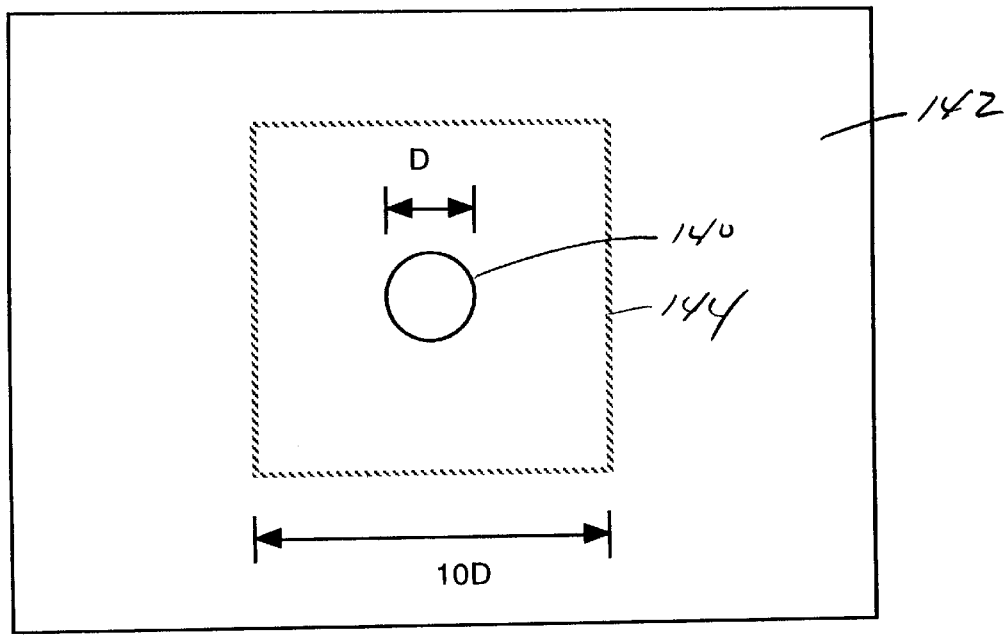
FIGS. 8A and 8B are schematic illustrations of an optical sensor imbedded in a material.
Figure 8B:
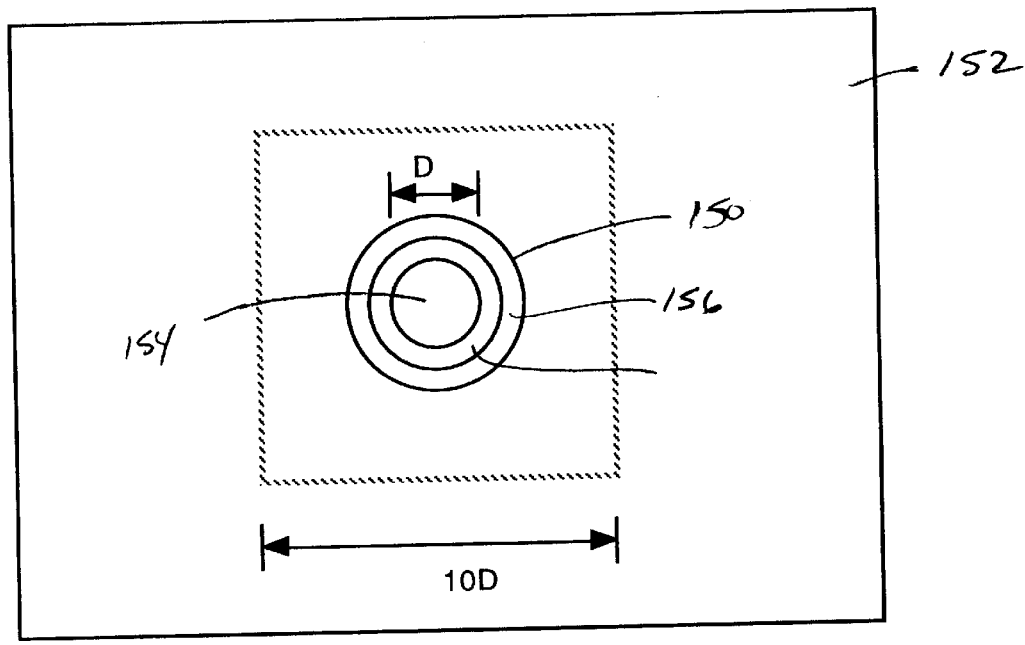

The optical readout systems for all sensor options yields an axial strain and temperature in the fiber core. When all sensor options are attached to the surface of these structures, then the axial strain and temperature in the core equals the axial strain and temperature in the structural surface, as illustrated, for example, in FIG. 1B. When an intrinsic sensor 140 is embedded in a material 142, as shown in FIG. 8A, the transverse stress exerted by the surrounding material 142 on the sensor 140 leads to stress concentrations in the fiber and immediately surrounding structural material. As a result, the very presence of the sensor 140 disrupts the strain field which is under investigation. In essence, the purpose is to measure the strains that would be present in the structure 142 if the sensor 140 were not there. This is accomplished by using finite analysis techniques to derive solutions for composite materials (e.g., a glass fiber in a solid material) to derive the stress and strain state in the fiber or sensor core in terms of far field strains in the material. The far field is a distance far enough away from the sensor so that stress and strain are no longer influenced by the presence of the sensor itself. For practical purposes, the far field is about 5 fiber diameters away from the center of the optical fiber, or about 1 mm. As illustrated in FIG. 8A, the dotted line 144 represents the far field region. The stress is calculated for the far field, and then that value is averaged over the entire enclosed region to estimate the stress at the sensor. Given the small displacement (e.g., 1 mm), the far field measurement is accurate. The arrangement of FIG. 8B employs extrinsic sensor 150 inbedded in the material 152. The sensor 150 comprises a fiber 154 surrounded by an alignment and support tube 156. The arrangement of FIG. 8B does not create a near field stress in the fiber 154 because the fiber is separated from the material 152 by air space 158. Thus the fiber is decoupled from the material, except through the outer tube.

In accordance with the present invention it is desirable to have the stress in the cylindrical portion of the fiber to be in the axial. Accordingly, the length of the sensor should be about 8 fiber diameters so as to allow the sensor to be as small as possible yet operate as if it were a cylinder so that it does not require calibration.

While there has been described are what are considered to be exemplary embodiments of the invention. It will be apparent to those skilled in the art that various changes and modifications may be made therein without departing from the invention. It is intended in the attached claims to cover such changes and modifications as fall within the true spirit and scope of the invention.

We claim:

1. A sensor for measuring temperature and strain comprising:

first and second optical sensors, for receiving an input signal and producing a first and second respective output signal in response to temperature and strain, said first sensor being formed of a first optical material having a corresponding first sensible thermomechanical response to temperature and strain, and said second sensor being formed of a second optical material having a corresponding second sensible thermomechanical response to temperature and strain, said first and second thermomechanical responses being sufficiently different from each other for allowing independent and simultaneous temperature and strain measurements based upon said first and second output signals.

2. The sensor of claim 1, wherein the first and second optical sensors each comprise at least one of an intrinsic Fabry-Perot inteferferometer, an extrinsic Fabry-Perot inteferferometer, an in-line fiber etalon sensor and a fiber-optic Bragg grating.

3. The sensor of claim 1, wherein the first and second optical sensors comprise at least one of extrinsic and intrinsic fiber-optic sensors.

4. The sensor of claim 1, wherein the first and second optical materials have different temperature dependent refractive indices.

5. The sensor of claim 1, wherein the first and second optical materials comprise materials having different responses to strain.

6. The sensor of claim 5, wherein the first and second optical materials comprise at least one of a relatively low birefringence material and a relatively high birefringence material.

7. The sensor of claim 1, wherein the optical materials comprise glasses.

8. The sensor of claim 1, wherein the optical materials comprise at least one of air, plastic and glass.

9. The sensor of claim 1, wherein the optical sensor comprises at least one of a PANDA, elliptical clad and bow-tie fiber.

10. The sensor of claim 1, wherein the optical sensor has a selected intrinsic diameter and a length of about eight times the intrinsic diameter.

11. The sensor of claim 1, wherein the optical sensor has an intrinsic diameter of about 125 microns and a length of about eight times the intrinsic diameter.

12. The sensor of claim 1, wherein the optical sensor has a length of at least about 1 mm.

13. The sensor of claim 1, wherein the first and second optical sensors each have an index of refraction in a range including glass and air.

14. The sensor of claim 1, wherein the first and second optical sensors comprise optical waveguides.

15. The sensor of claim 14, wherein the optical waveguide comprises at least one of a fiber optic, a planar wave guide and a channel waveguide.

16. The sensor of claim 1, wherein the first and second optical sensors comprise single mode fibers.

17. The sensor of claim 1, wherein the optical material is formed of a high birefringent material.

18. An optical sensor comprising:

first and second single mode optical waveguide sensors, each for measuring temperature and strain for receiving an optical input signal and respectively producing a corresponding optical output signal, said first sensor being formed of a first optical material having a corresponding first sensible thermo-mechanical response to temperature and strain and said second sensor being formed of a second optical material having a corresponding second sensible thermo-mechanical response to temperature and strain, said first and second thermo-mechanical responses being sufficiently different so as to allow independent and simultaneous temperature and strain measurements based upon the output signals.

19. Apparatus for measuring temperature and strain in a material comprising:

first and second single-mode optical waveguide sensors, said first sensor being formed of a first optical material having a corresponding first optically sensible response to thermo-mechanical stimuli, and said second sensor being formed of a second optical material having a corresponding second optically sensible response to thermo-mechanical stimuli different from the first response;

means for launching an input light signal into the waveguide sensors, each said waveguide for producing a unique light signal output in accordance with the temperature and strain response of the corresponding waveguide to thermo-mechanical stimuli;

means optically coupled to the waveguides responsive to each of said unique light signal outputs of the respective first and second waveguides for producing independent and simultaneous temperature and strain measurements based upon said outputs.

20. The apparatus according to claim 19, wherein the means responsive to the unique light signal output of the waveguides comprises an optical demodulator.

21. The apparatus according to claim 19, wherein the waveguides comprise at least one of a Fabry-Perot interferferometer, an in-line fiber etalon sensor and a fiber-optic Bragg grating.

22. The apparatus according to claim 19, wherein the sensors each have a corresponding thermo-mechanical responsive index of refraction, each index having a temperature dependence sufficiently different from one another such that resulting strain and temperature measurements are independent.

23. An optical fiber sensor comprising:

first and second fiberoptic sensors, said first sensor being formed of a first optical material having a corresponding first sensible thermomechanical response to temperature and strain and said second sensor being formed of a second optical material having a corresponding second sensible thermomechanical response to temperature and strain, said first and second thermomechanical responses being sufficiently different so as to allow independent and simultaneous temperature and strain measurements based upon said different responses.

24. A sensor for independently measuring temperature and strain comprising:

first and second proximately located optical sensors for measuring temperature and strain at a selected location, said first sensor being formed of a first optical material having a corresponding first sensible thermomechanical response to temperature and strain and said second sensor being formed of a second optical material having a corresponding second sensible thermomechanical response to temperature and strain, said first and second thermomechanical responses being sufficiently different for allowing independent and simultaneous temperature and strain measurements at the location based upon said different response.

* * * * *